United States Patent [19]

Mouner

[11] Patent Number: 5,223,889
[45] Date of Patent: Jun. 29, 1993

[54] WEDGE EXPOSURE CONTROL SYSTEM

[76] Inventor: John Mouner, 205 Adams Ave., Staten Island, N.Y. 10306

[21] Appl. No.: 888,511

[22] Filed: May 26, 1992

Related U.S. Application Data

[63] Continuation-in-part of Ser. No. 845,321, Mar. 3, 1992.

[51] Int. Cl.⁵ .................. G03B 27/52; G03B 27/70; G03B 27/72; G02B 23/00
[52] U.S. Cl. .................................. 355/43; 354/122; 354/296; 355/71; 355/126; 359/616
[58] Field of Search .............. 355/43, 52, 71, 125, 355/126; 354/120, 122, 76, 77, 80, 296; 359/616, 617; 353/1, 2

[56] References Cited

U.S. PATENT DOCUMENTS

| | | | |
|---|---|---|---|
| 3,642,342 | 2/1972 | De Larrain | 359/616 |
| 3,661,439 | 5/1972 | Burnside, III et al. | 359/616 |
| 3,719,128 | 3/1973 | Simmons | 354/122 |
| 4,172,658 | 10/1979 | Tani et al. | 355/71 X |
| 4,229,099 | 10/1980 | Watkins | 355/71 |
| 4,653,901 | 3/1987 | Loce et al. | 355/71 |
| 4,952,004 | 8/1990 | Baird et al. | 359/616 |
| 4,998,789 | 3/1991 | Atkins | 359/616 |

Primary Examiner—Richard A. Wintercorn
Attorney, Agent, or Firm—Kane, Dalsimer, Sullivan, Kurucz, Levy, Eisele and Richard

[57] ABSTRACT

The apparatus is a visual design system for reliably reproducing kaleidoscope-type images. A design element is fixed rotationally, vertically and horizontally with various gradients in a projection system and illuminated. The resulting image is projected through a bellows, also including various possible configurations. An image receiving system with height and longitudinal adjustment and corresponding gradients receives the image on a translucent viewing screen. The image is received between two kaleidoscope-type mirrors with an adjustable angle therebetween. A camera records the resulting image.

An opaque wedge in a filter-like position, along with an appropriate aperture and resulting depth of field, is used to assure an evenly illuminated image. Similarly, the focal plane can be inclined in order to reduce any distortion caused by the increase in object distance for a portion of the image caused by the kaleidoscope-type mirrors.

9 Claims, 12 Drawing Sheets

FIG.14A NO WEDGE F 5.6 LENS STOP
0-NORMAL EXPOSURE
1-STOP UNDER
2-STOPS UNDER

FIG.14B WITH 90° WEDGE F 5.6 LENS STOP
0-NORMAL EXPOSURE

FIG.14C PLACEMENT OF 90° PIE SHAPED WEDGE ON U.V. FILTER

FIG.15A F 5.6 NO WEDGE

FIG.15F F 5.6 NORMAL EXPOSURE

WEDGE EXPOSURE CONTROL SYSTEM

This application is a continuation-in-part application of "Visual Compute Design Permutation Apparatus", Ser. No. 07/845,321, filed Mar. 3, 1992.

BACKGROUND OF THE INVENTION

1. Field of the Invention

The invention pertains to an apparatus for reliably reproducing and photographing a design produced by a kaleidoscope-type configuration wherein the configuration is adjustable so as to produce a great variety of designs. Additionally, this invention pertains to an apparatus for producing evenly exposed photographic images in such a system.

2. Description of the Prior Art

The kaleidoscope is a well-known toy. The kaleidoscope can create a nearly infinite number of designs. In fact, the common wisdom of childhood holds that one can never get a kaleidoscope to create the same pattern twice.

While U.S. Pat. No. 4,952,004 issued on Aug. 28, 1990 to Baird et al. has made some recent improvements to the kaleidoscope, the kaleidoscope has not progressed to a widely-used professional design instrument in due to its inability to reliably reproduce patterns.

Additionally, it has been difficult to achieve evenly exposed photographic images from kaleidoscope apparatus and in other applications where a wedge-shaped element in the object to be photographed is brighter than the remaining portion of the scene (such as an interior photograph of a stained-glass window). While filters with 360°, 180°, 90° or similar portions including neutral density elements are known in the prior art, these filters have not provided a satisfactory solution in this regard.

OBJECTS AND SUMMARY OF THE INVENTION

It is therefore an object of this invention to provide a kaleidoscope as a professional design instrument wherein a chosen pattern can be reliably reproduced.

It is therefore a further object of this invention to provide such a professional design instrument with the ability to produce a wide variety of patterns, particularly from two or three dimensional basic design elements or natural objects.

It is therefore a final object of this invention to provide such a professional design instrument with photographic capabilities.

It is therefore a final object of this invention to provide an apparatus for the even exposure of images wherein a wedge-shaped element in the object to be photographed is brighter than the remaining portion of the scene.

These and other objects are achieved by providing an apparatus with a 360 degree motor-driven rotating wheel, within which a design element is placed, the wheel being locating between a condensing light system and the projection lens; a moveable projection system, placed on a graduated track upon which lenses of different focal lengths may be mounted; and a moveable adjustable image receiver box including two mirrors at an angle to one another for multiply reflecting the image of the basic design element and a camera body for photographing the resulting image.

The above components include various graduated scales for the reliable reproduction of apparatus configuration. The rotating wheel includes a graduated scale showing the degrees of rotation, the graduated track includes a scale showing millimeters of displacement. The image receiver box can be likewise adjusted vertically or horizontally or swivelled. Finally, the angle of the mirrors to each other can be reproducibly adjusted.

Additionally, the apparatus includes a clear filter or slide holder as a carrier for an opaque wedge which is used to reduce the exposure in a wedge shaped portion of the image. The spatial effect of this opaque wedge is controlled by varying the aperture (thereby varying the depth of field) of the photographic apparatus.

BRIEF DESCRIPTION OF THE DRAWINGS

Further objects and advantages of the invention will become apparent from the following description and claims, and from the accompanying drawings, wherein:

DETAILED DESCRIPTION OF THE PREFERRED EMBODIMENT

Figures 1A, 1B:
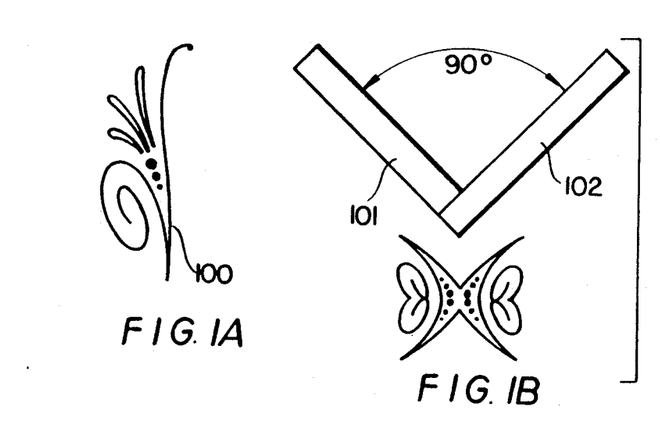
FIG. 1A shows a basic unreflected design element.
FIGS. 1B through 1I illustrate mirror relations and the resulting images formed from the basic design element of FIG. 1A.
Figure 1C:
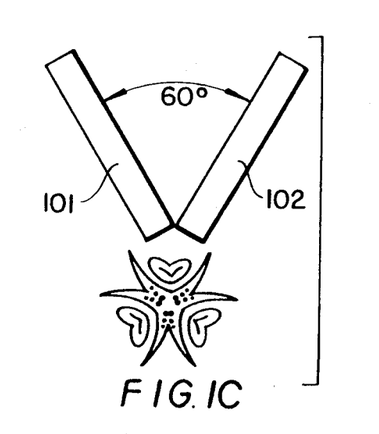
Figure 1D:
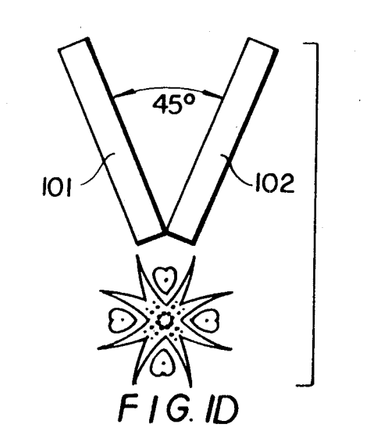
Figure 1E:
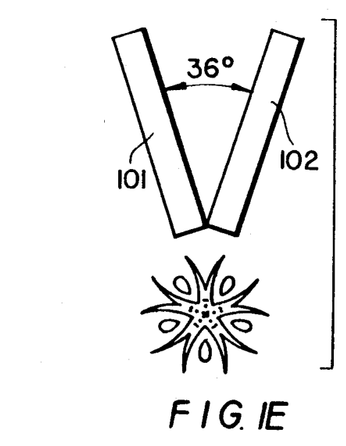
Figure 1F:
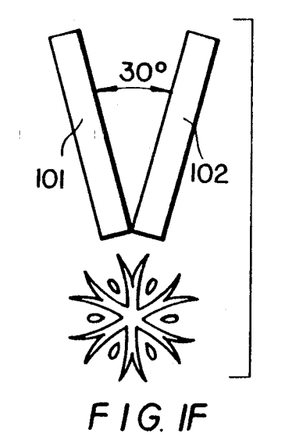
Figure 1G:
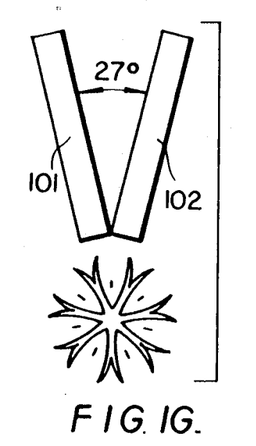
Figure 1H:
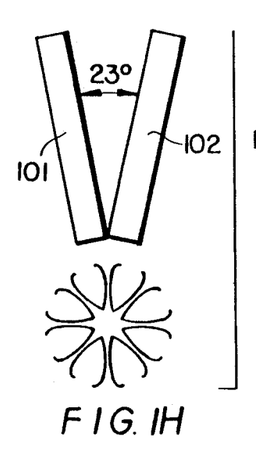
Figure 1I:
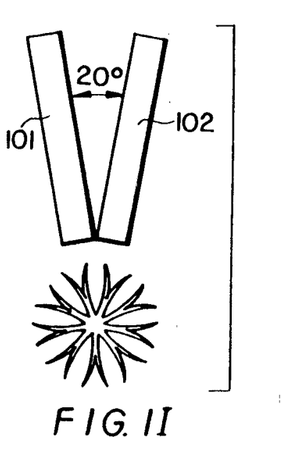

Referring now to the drawings in detail wherein like numerals refer to like elements throughout the several views, FIG. 1A discloses an illustrative design element 100. FIGS. 1B through 1I illustrate various patterns which may be created by placing mirrors 101, 102 at different angles (wherein the various illustrated angles are integer divisions of 360 degrees) to each other. While not directly illustrated in these figures, it should be obvious that the vertical and horizontal translation of the mirrors 101, 102 with respect to design element 100 can greatly change the resulting image.

Figure 2:
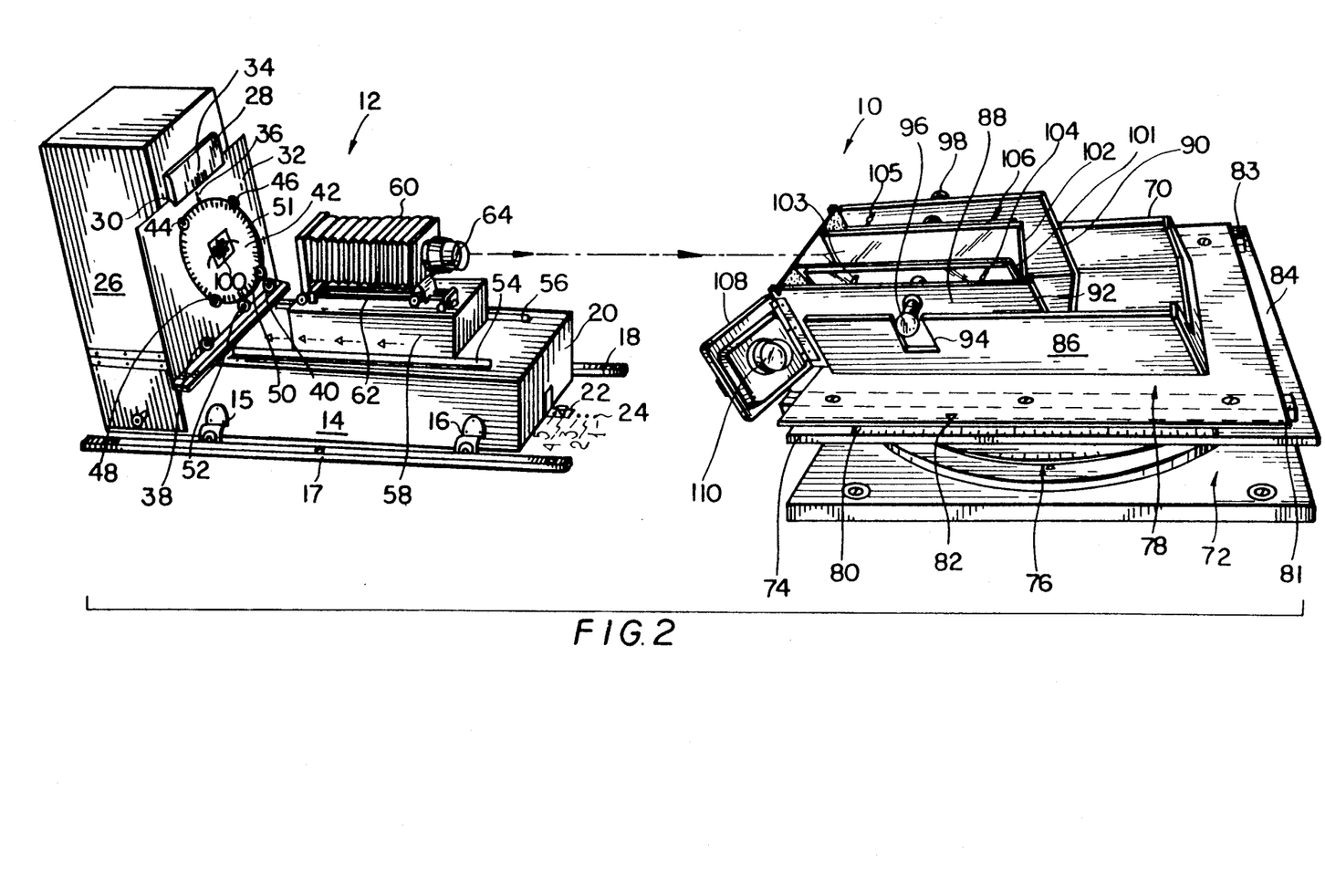
FIG. 2 is a front perspective view of an embodiment of the present invention.
Figure 3:
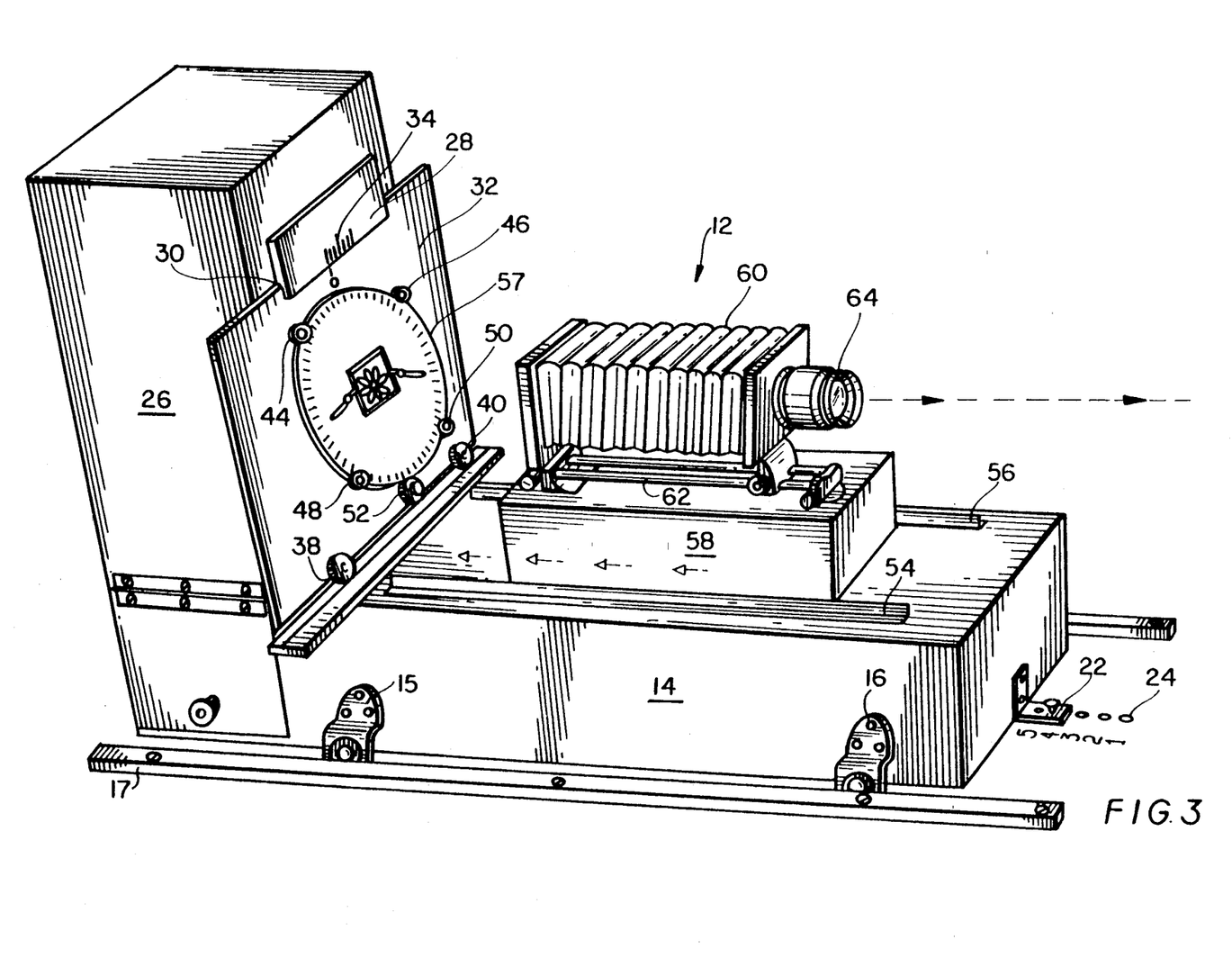
FIG. 3 is a front perspective view of the projection system of an embodiment of the present invention.

FIG. 2 illustrates a basic embodiment of the apparatus 10. Projection system 12 (also see FIG. 3) includes a body 14 with lateral flanges 15, 16 which slidably engage rails 17, 18 which are fixed to a ground surface (such as a table or other platform). Forward end 20 of body 14 further includes an L-connection 22 which is adjustably positioned in pre-selected and numbered apertures 24 thereby providing reproducibly adjustable positions for body 14. Body 14 further includes upright portion 26 with a protruding element 28 with a channel 30 therein in which easel 32 laterally slides. Element 28 includes a scale 34 which variably aligns with a tick mark 36 on easel 32. The lower portion of easel 32 is engaged by wheels 38, 40 which secure easel 32 within a groove to upright portion 26. Easel 32 further includes a rotatable pallet 42 secured thereto by rotating slotted wheels 44, 46, 48, 50. Pallet 42 includes a protractor type gradient 51 which is selectively aligned with tick mark 36 so as to properly orient design element 100. Pallet 42 is rotated by motor driven friction drive wheel 52 connected to a small motor (not shown) rear to easel 32. Upright portion 26 may include a projection lamp system (to be illustrated) where the bulb may be swung away to be replaced by an electronic flash bulb when a stronger light source is needed. (The flash bulb is attached to the end of a plastic tube and slides into a position vacated by the projection bulb.) Body 14 further includes tracks 54, 56 upon which bellows support 58 slidably rests. Bellows 60 includes an adjustable track 62 and a detachable lens 64 of a pre-selected focal length.

Figure 4:
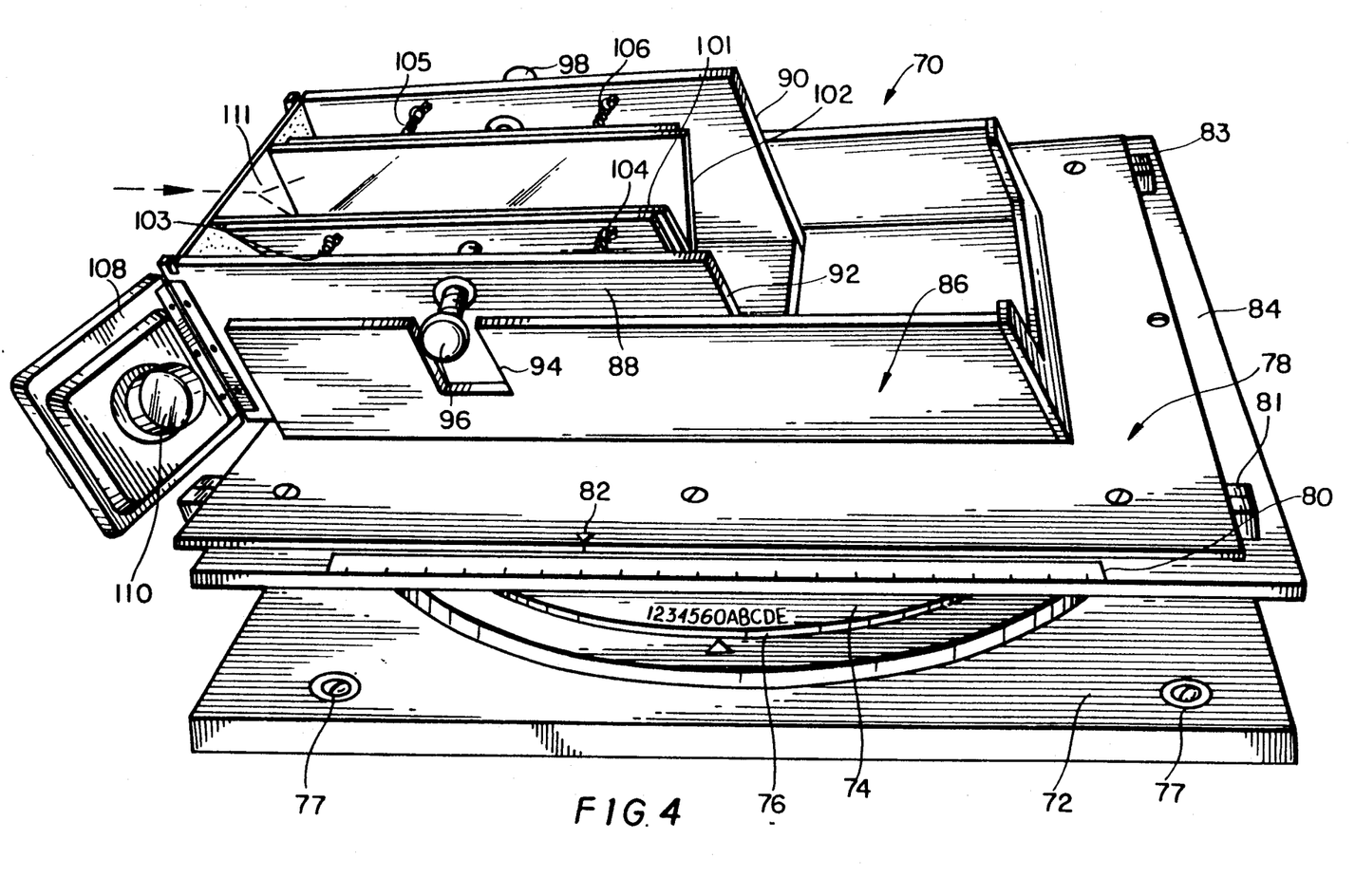
FIG. 4 is a front perspective view of the image receiver box of an embodiment of the present invention.
Figure 5:
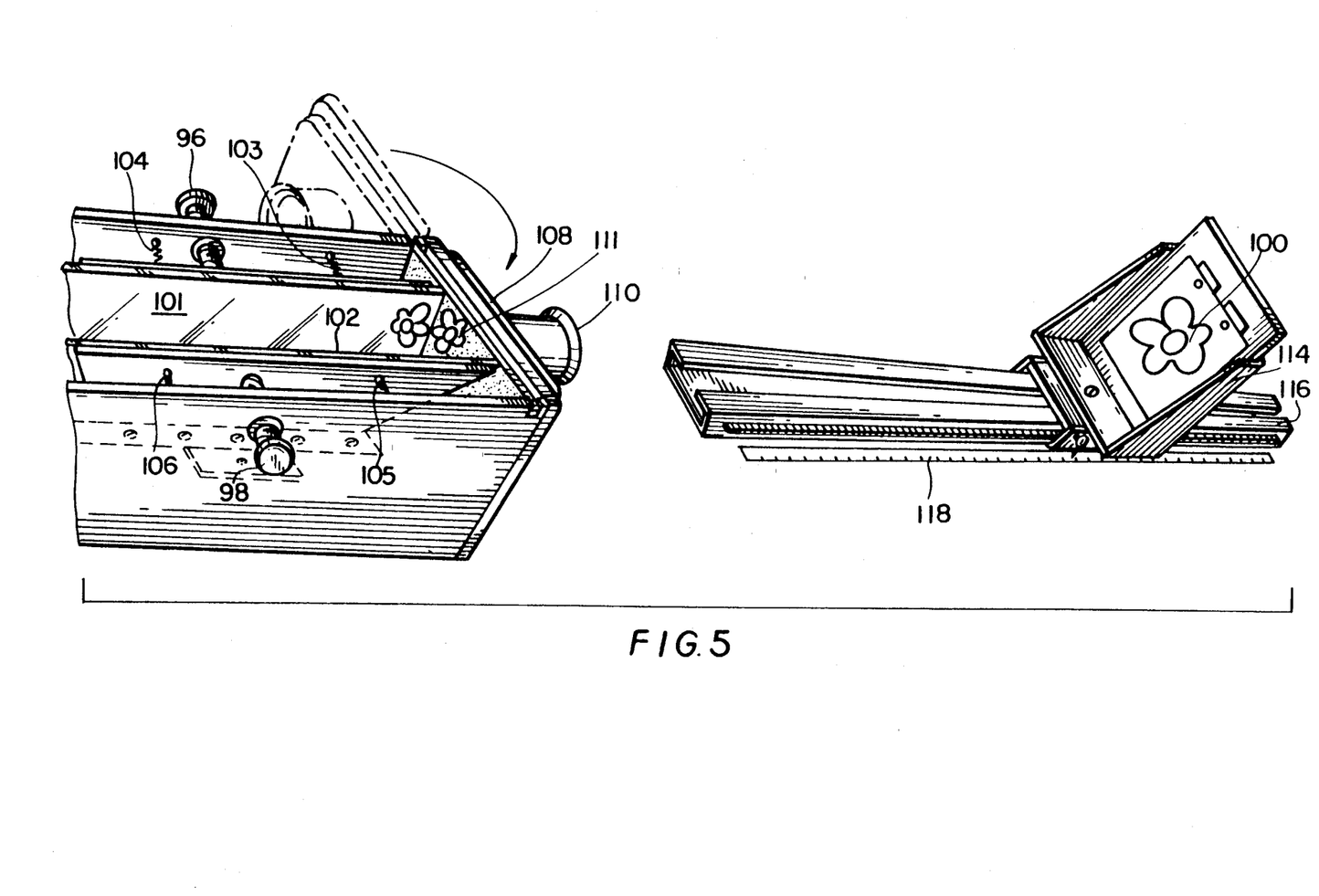
FIG. 5 is a perspective view of an alternate implementation of the image receiver box.
Figure 10:
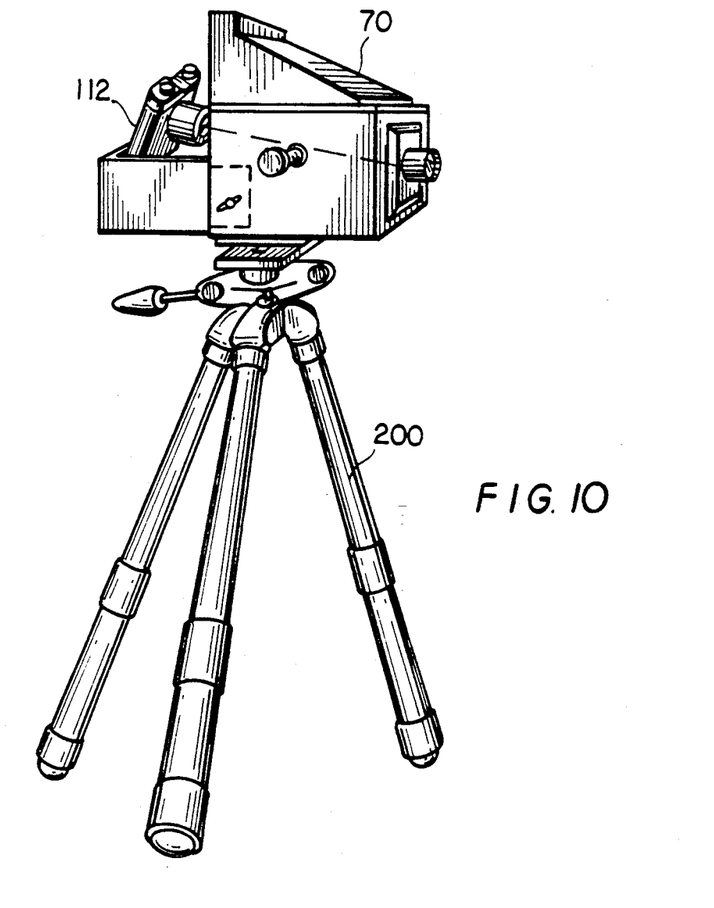
FIGS. 10 and 11 are perspective views, partially in cross-section, of a portable image receiver box.

The image of the design element 100 is projected through bellows 60 and lens 64 to image receiver box 70 (also see FIG. 4). Image receiver box 70 includes a base 72 fixably secured to the ground with rotational adjustment implemented by a "lazy-susan" apparatus 74 with a gradient scale 76. Height adjustment is made by using a precision scissor action lift apparatus 73 or any other adjustable platform (see FIG. 6). Base 72 is secured by bolts 77 to scissor lift apparatus 73. Above lazy-susan apparatus 74 is platform 84 with a longitudinal gradient scale which is selectively aligned with tick marks 82 on metal sliding plate 78 attached to two sliding rails 81, 83 (see FIG. 4). Scissor lift apparatus 73 should be noted when in use in the compute mode in any of the three stated positions (see FIG. 8). Measurements are taken from platform 72 to table 124 to use as a reference guide number to repeat the same design or a close approximation thereof, if need be. Three-sided support formation 86 is attached to sled 84. Image receiver box 88 fits into formation 86. Image receiver box 88 includes sidewalls 90, 92 with aperture 94 through which adjustment bolts 96, 98 adjustably urge mirrors 101, 102 (introduced in FIGS. 1B et seq.) to different angles. Elastic means 103, 104, 105, 106 urge mirrors 101, 102 towards sidewalls 90, 92. The interior end of image receiver box 88 includes hinged end 108 upon which receiving lens 110 is mounted to receive an image of design element 100 (either two or three dimensional) and project the image onto rear projection screen material 111, which in turn, provides an image for mirrors 101, 102. As illustrated in FIGS. 5 and 10 (the lens is used only in modes as in FIGS. 5 and 10 only), the image receiver box 88 provides a mounting for camera 112.

By adjusting (and recording) the selection of image size, aperture 24, the position of bellows support 58, the front and rear position of bellows 60 on track 62, the focal length and focus setting of lens 64, the height of bolts 77, the setting of gradient 34 and protractor gradient 51, the height of platform 72 from table 124, the setting of gradients 76 and 80, the position of knobs 96, 98, and, of course, the selected design element, an image may be faithfully reproduced.

FIG. 5 illustrates an alternative embodiment with the design element 100 mounted on a mount 114 on a rail 116 with a gradient 118.

Figure 6:
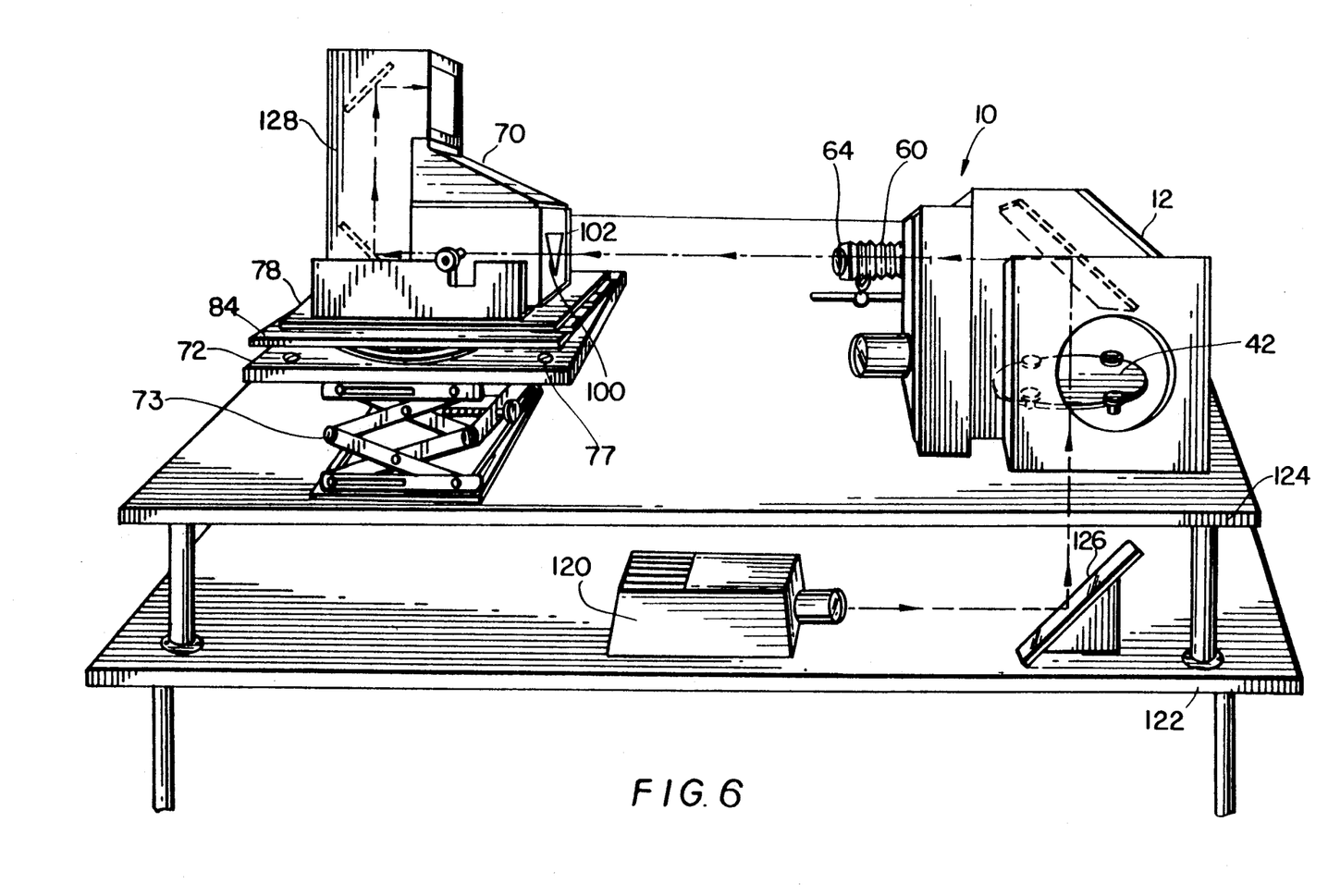
FIG. 6 is a perspective view, partially in phantom, of an alternative embodiment of the invention.

FIG. 6 illustrates another alternative embodiment wherein the projection lamp 120 is placed between two platforms 122, 124 to illuminate a transparent design element 100 on pallet 42 via mirror 126. Camera 112 is replaced with a viewer 128.

Figure 7:
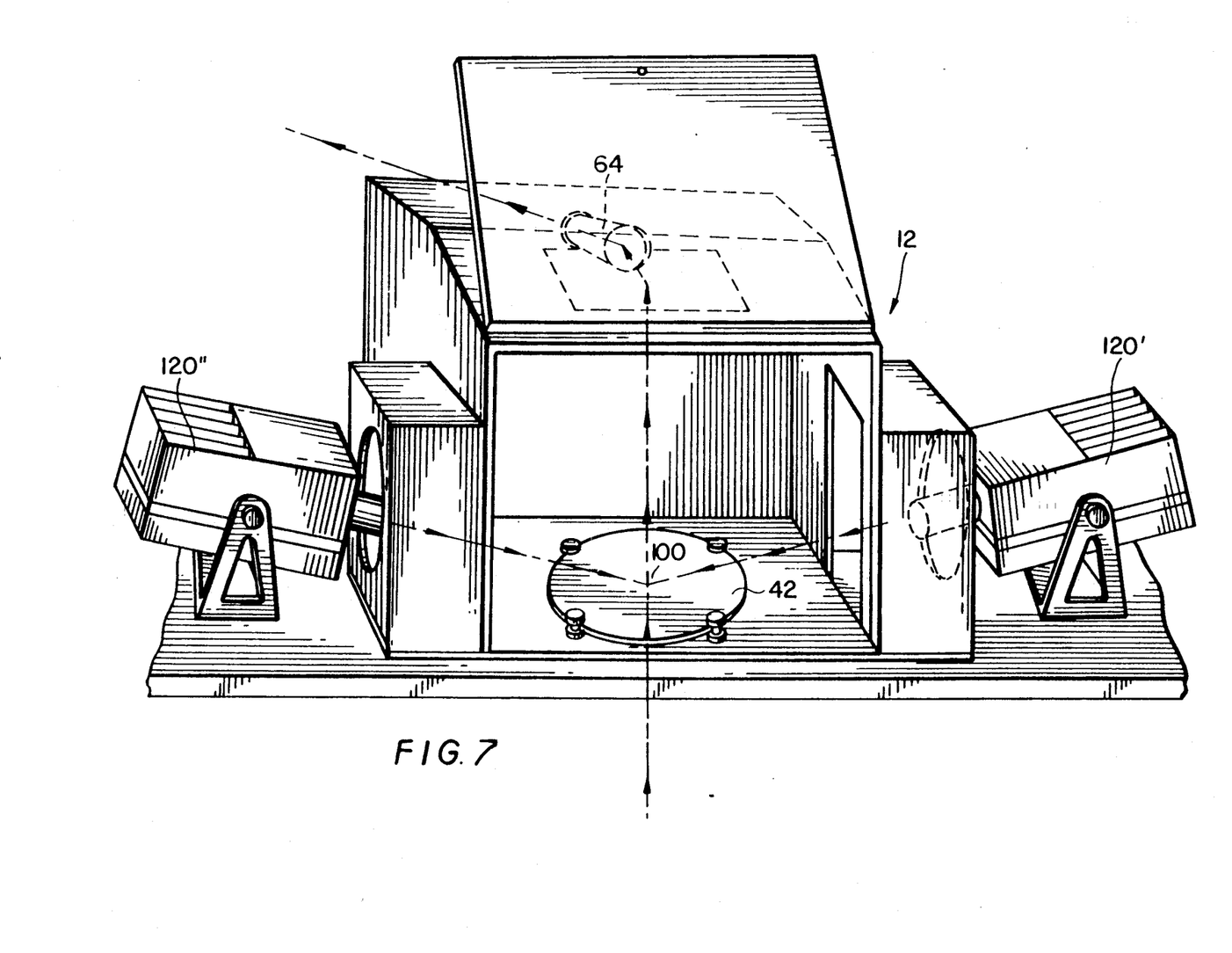
FIG. 7 is a perspective view, partially in phantom, of an alternative projection system of the invention.

FIG. 7 illustrates an alternative projection system 12 for an opaque design element using projection lamps 120' and 120".

Figures 8, 9:
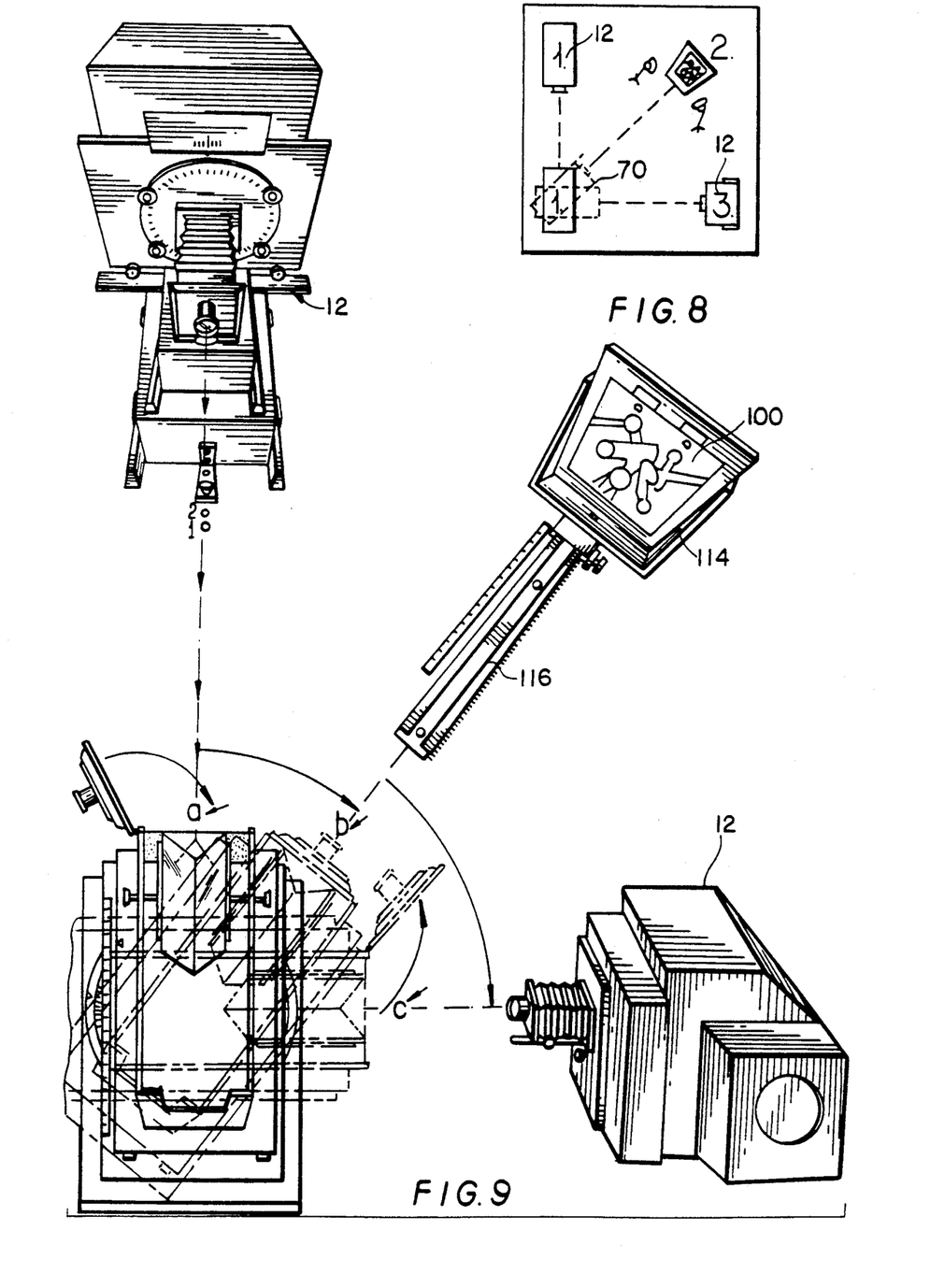
FIG. 8 is a diagram of the invention using multiple projection systems.
FIG. 9 is a perspective view of the embodiment of the invention diagrammed in FIG. 8 using multiple projection systems.

FIGS. 8 and 9 illustrate a hybrid embodiment with a swivelled image receiver box 70, two projection systems 12, and a rail 116 with a mount 114 (as illustrated in FIG. 5).

FIG. 10 illustrates an image receiver box 70 with a camera 112, image receiver box 70 being mounted on mounted on a tripod 200.

Figure 11:
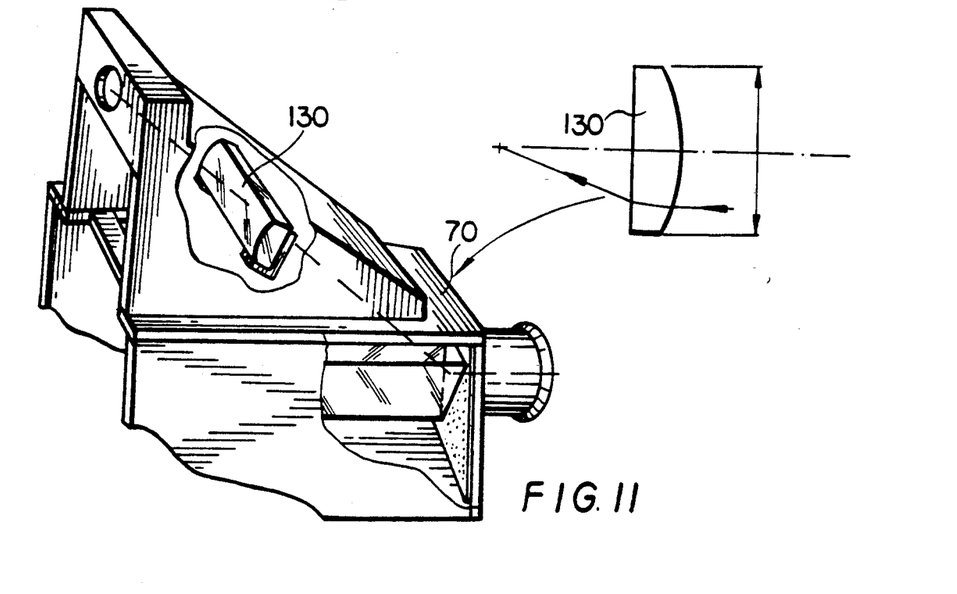

FIG. 11 illustrates the use of a plano-convex lens 130 to provide a viewing apparatus for image receiver box 70.

Figures 12, 12A:
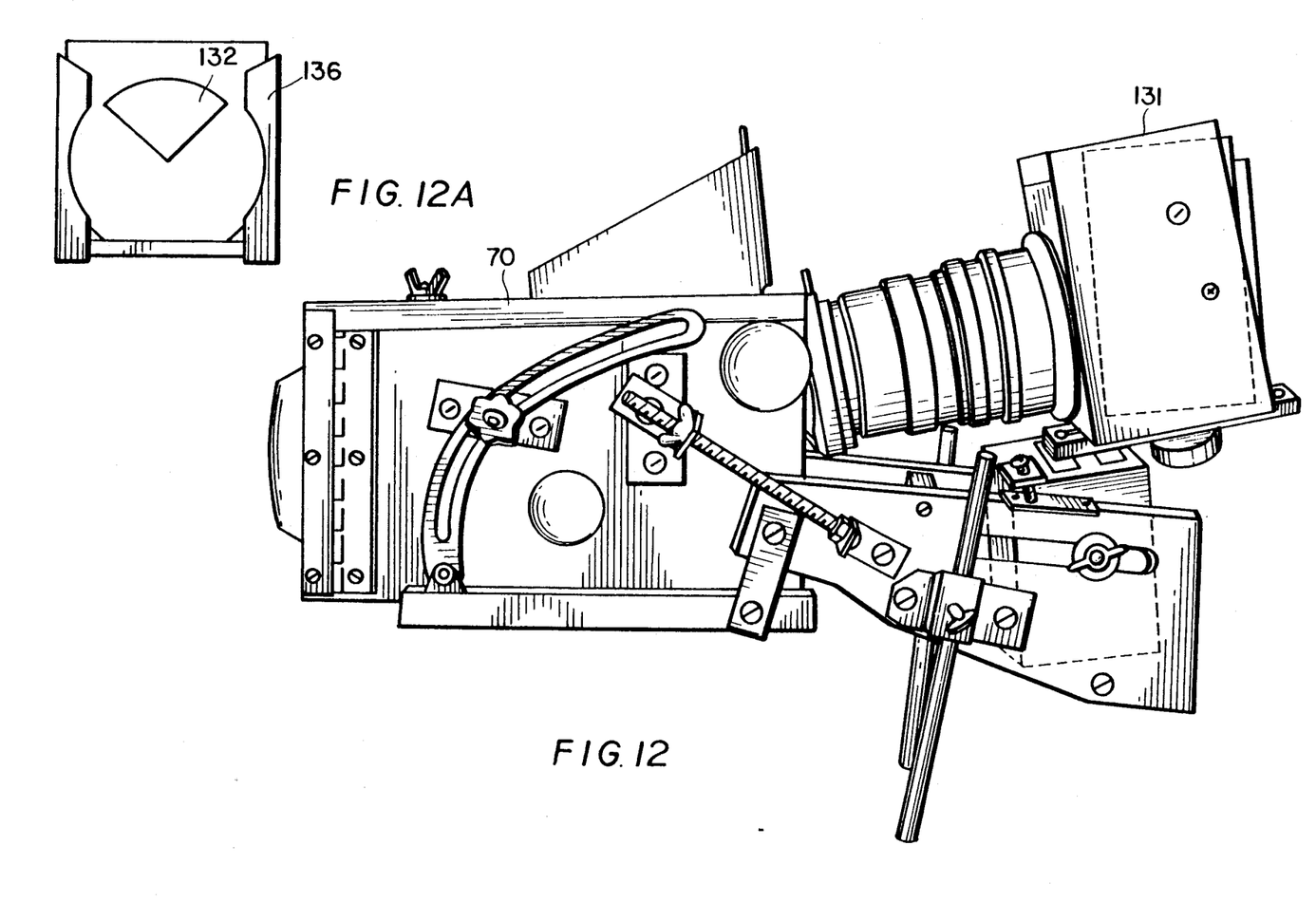
FIGS. 12 and 12a are a perspective view of the photographic apparatus of the present invention, and a wedge exposure control system.
Figure 14A:
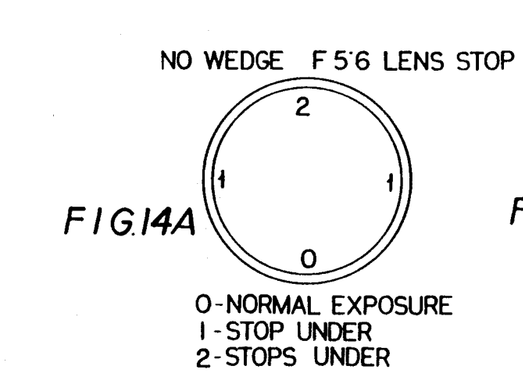
FIG. 14a illustrates the expected exposure distribution without the wedge exposure control system.
Figure 14B:
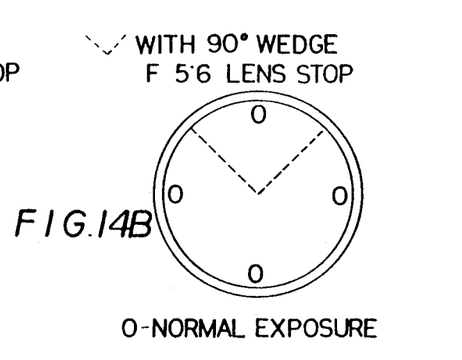
FIG. 14b illustrates the expected exposure distribution with the wedge exposure control system.
Figure 14C:
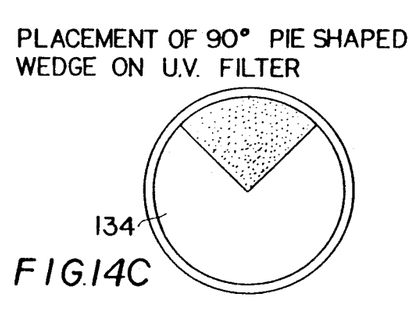
FIG. 14c illustrates the placement of the 90° pie-shaped wedge.
Figure 15A:
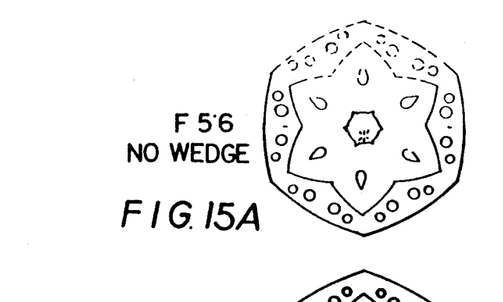
FIG. 15a illustrates the exposure of the image without the use of the wedge exposure control system.
Figure 15B:
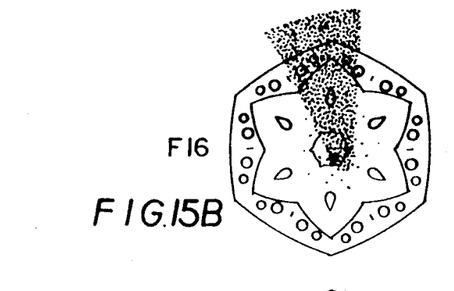
FIG. 15b illustrates the exposure of the image with the use of the wedge exposure control system at F 16.
Figure 15C:
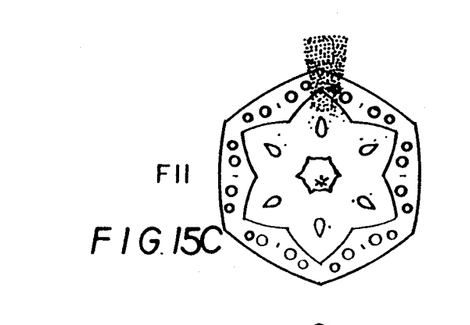
FIG. 15c illustrates the exposure of the image with the use of the wedge exposure control system at an aperture setting of F 11.
Figure 15D:
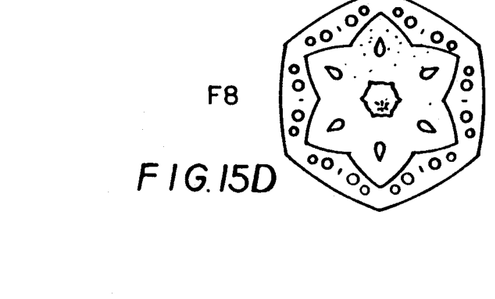
FIG. 15d illustrates the exposure of the image with the use of the wedge exposure control system at an aperture setting of F 8.
Figure 15E:
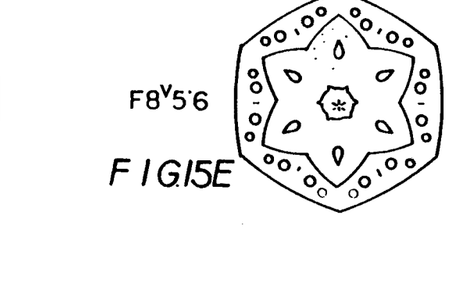
FIG. 15e illustrates the exposure of the image with the use of the wedge exposure control system at an aperture setting of between F 8 and F 5.6.
Figure 15F:
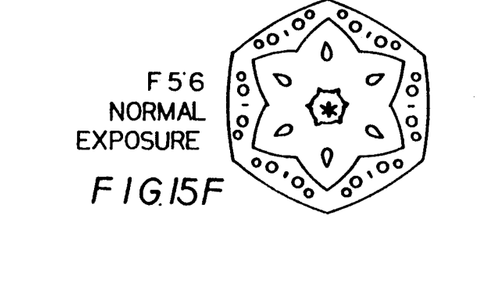
FIG. 15f illustrates the exposure of the image with the use of the wedge exposure control system at an aperture setting of F 5.6.

FIG. 12 illustrates the placement of the wedge exposure control system in a variation of image receiver box 70 (camera 131) of apparatus 10. As shown in FIGS. 14a and 15a (notice the thin and broken lines at the top portion of FIG. 15a, intending to represent overexposure), the portion of the image which has not been reflected by mirrors 101, 102 will typically be overexposed with respect to the remainder of the image. This problem is analogous to a person inside a cathedral trying to take a picture of the stained-glass window from the inside while allowing sunlight to stream through the window and further trying to capture the detail of the wall inside of the cathedral. The portion of the image including the window will be more brightly illuminated than the remainder of the image and hence the wall will be underexposed. Therefore, by placing an opaque wedge 132 (with a rotational angle of between 45° and 180°, but preferably 90° with a point intersecting the centerline of the lens of the camera 131) on a carrier such a U.V. filter 134 (FIG. 14c) or a slide carrier 136 (FIG. 12) immediately in front of the lens of camera 131, the uniform exposure illustrated in FIG. 14b is achieved after the appropriate f-stop and corresponding depth of field is chosen. As shown in FIGS. 15b-15f, too small of an aperture (i.e., too high of an f-number), such as F16, F11, or to a lesser extent, F8, results in too great of a depth of field and the appearance of the wedge on the image. However, with the appropriate choice of aperture, e.g., F 5.6, as shown in FIG. 15f, the wedge disappears from the image and the image is uniformly illuminated.

Figure 13A:
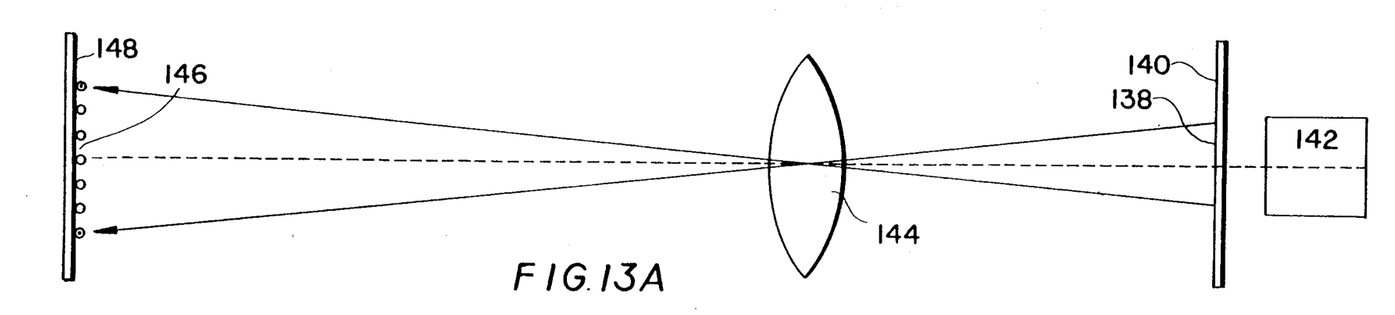
FIG. 13a illustrates the formation of the image proximate to the focal plane in the absence of a kaleidoscope device.
Figure 13B:
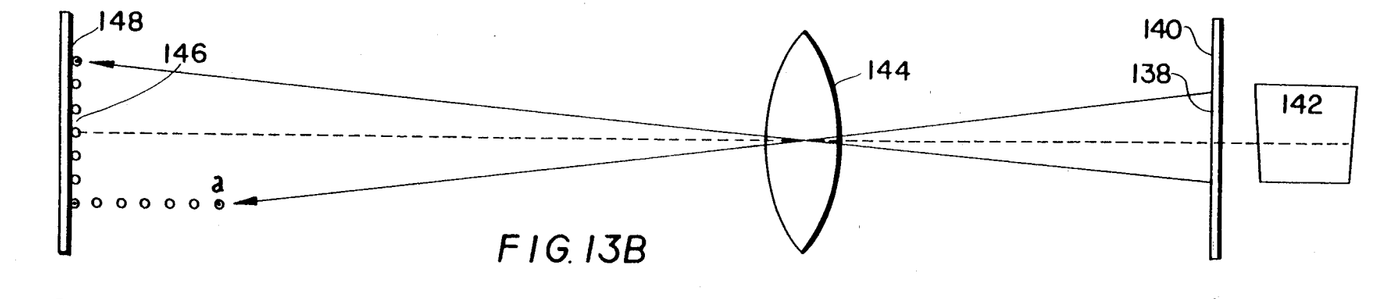
FIG. 13b illustrates the formation of the image proximate to the focal plane in the presence of a kaleidoscope device.
Figure 13C:
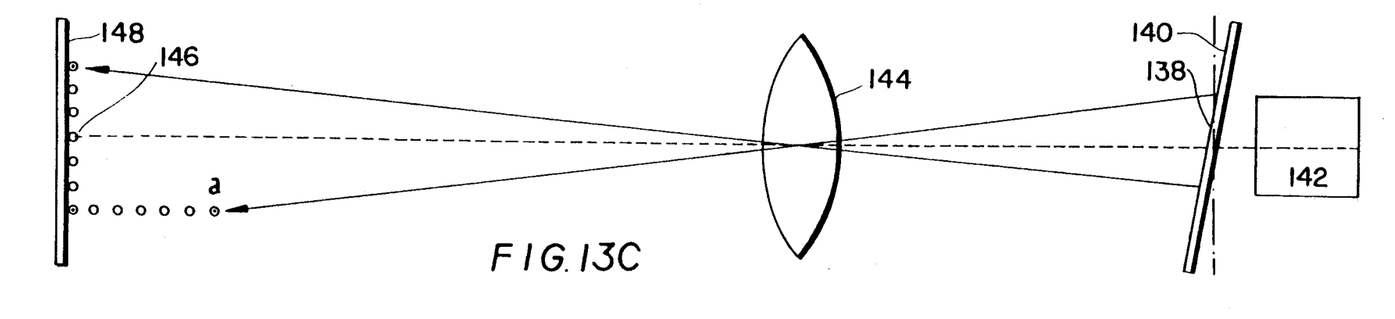
FIG. 13c illustrate the correction of the image proximate to the focal plane in the presence of a kaleidoscope device.

Similarly, as shown in 13a, the normal formation of image 138 on focal plane 140 and film 142 through optics 144 from vertical projected image 146 on reverse projection screen 148. However, as shown in FIG. 13b, with the use of the Visual Compute Design Permutation Apparatus 10, a portion of the reflected image (a) is nearer to the reverse projection screen 148 due to certain reflected portions of the image having a longer object distance therefore causing distortion with lines converging inward at the bottom of the image on the focal plane 140. Therefore, as shown in FIG. 13c, by inclining focal plane 140 and film 142 within camera 131, the distortion is corrected and the mirrored image is sharp at the widest aperture.

As previously described, the user is able to reliably reproduce and photograph patterns by setting and recording the various aforementioned adjustments and selections of apparatus 10.

Thus the several aforementioned objects and advantages are most effectively attained. Although a single preferred embodiment of the invention has been disclosed and described in detail herein it should be understood that this invention is in no sense limited thereby and its scope is to be determined by that of the appended claims.

What is claimed is:

1. A visual design apparatus including:
   a projection system including means for holding a design element; means for rotating said means for holding, said means for rotating further including a first gradient means; means for illuminating the design element; means for projecting an illuminated image of the design element; and means for adjusting a position of said projection system, said means for adjusting including a second gradient means;
   an image receiving system including means for receiving the illuminated image from said means for projecting; multiple image reflecting means including at least two mirrors at an adjustable angle to each other; means for adjusting said adjustable angle; means for adjusting a position of said image receiving system, and means for receiving a photographic means oriented toward said multiple image reflecting means;
   said photographic means further including a camera with a lens and means for supporting an opaque wedge immediately in front of said lens, wherein the rotational position of said wedge is chosen in accordance with unevenly illuminated portions of an image received by said photographic means.

2. The visual design apparatus of claim 1 wherein said wedge includes substantially 90° of a circle.

3. The visual design apparatus of claim 2 wherein an aperture of said lens is selected to evenly illuminate an image produced by said photographic means.

4. The visual design apparatus of claim 1 wherein said camera includes a focal plane and means for adjusting an angle of said focal plane wherein distortion caused by said an increased object distance caused by said multiple image reflecting means for a portion of an image received by said photographic means.

5. An attachment for a lens of a photographic camera including:
   transparent carrier means engaging the lens; and
   an opaque wedge with a rotational angle of between 45° and 180° on said transparent carrier.

6. The attachment for a lens of claim 5 wherein said rotational angle is substantially 90° and wherein said wedge includes a point substantially intersecting a centerline of said lens.

7. The attachment for a lens of claim 6 wherein said transparent carrier means comprises a substantially transparent filter.

8. The attachment for a lens of claim 7 wherein said transparent carrier means comprises a U.V. filter.

9. The attachment for a lens of claim 7 wherein said transparent carrier means comprises a slide carrier.

* * * * *